United States Patent [19]

Kawase

[11] Patent Number: 6,073,845
[45] Date of Patent: *Jun. 13, 2000

[54] RECORDING MEDIUM ON WHICH INFORMATION IS RECORDED IN INTERMITTENT PATTERN, AND METHOD OF AND APPARATUS FOR REPRODUCING THE INFORMATION

[75] Inventor: Masahiro Kawase, Higashimatsuyama, Japan

[73] Assignee: Canon Denshi Kabushiki Kaisha, Saitama-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/763,854

[22] Filed: Dec. 11, 1996

[30] Foreign Application Priority Data

Dec. 19, 1995 [JP] Japan .................................. 7-329979

[51] Int. Cl.$^7$ ............................................... G06K 7/08
[52] U.S. Cl. .............................. 235/449; 235/493; 360/2
[58] Field of Search .................... 235/449, 493, 235/440, 487, 437; 360/2, 40

[56] References Cited

U.S. PATENT DOCUMENTS

| | | | |
|---|---|---|---|
| 4,239,151 | 12/1980 | Enser et al. | 235/437 |
| 4,239,959 | 12/1980 | Gutterman | 235/493 |
| 4,303,949 | 12/1981 | Peronnet | 235/493 |
| 4,786,788 | 11/1988 | Gaucher | 235/432 |
| 5,073,880 | 12/1991 | Maeda et al. | 369/32 |
| 5,196,681 | 3/1993 | Mantegazza | 235/449 |
| 5,296,995 | 3/1994 | Yonezawa | 235/493 |
| 5,466,914 | 11/1995 | Kitahara | 235/483 |
| 5,625,618 | 4/1997 | Oki | 369/275.1 |

FOREIGN PATENT DOCUMENTS 0310707  10/1987   European Pat. Off. ........ B42D 15/02

OTHER PUBLICATIONS

U.S. application No. 08/763,854, Takada, filed Aug. 17, 1993.

Primary Examiner—Donald Hajec
Assistant Examiner—Daniel St. Cyr
Attorney, Agent, or Firm—Robin, Blecker & Daley

[57] ABSTRACT

A magnetic card provided with a recording track in which a magnetic portion is disposed in an intermittent pattern corresponding to a digital signal is employed, and the magnetic portion of the recording track is magnetized immediately before information is read from the magnetic card. Then, a magnetism detecting device is made to relatively move with respect to the recording track to detect a magnetic flux arising from the magnetic portion, thereby reading the information represented by the digital signal.

5 Claims, 8 Drawing Sheets

F I G. 4(a)
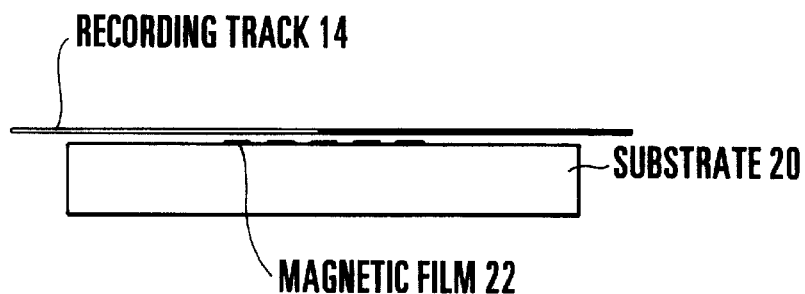
F I G. 4(b)
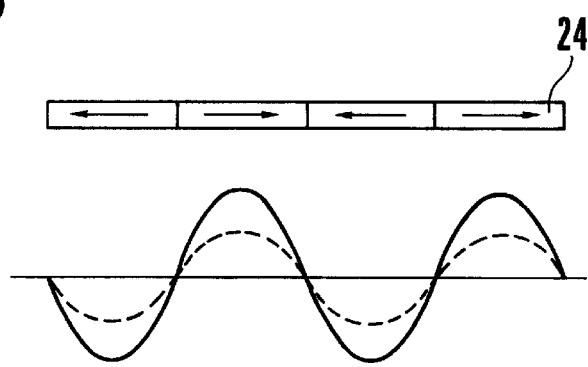
F I G. 4(c)
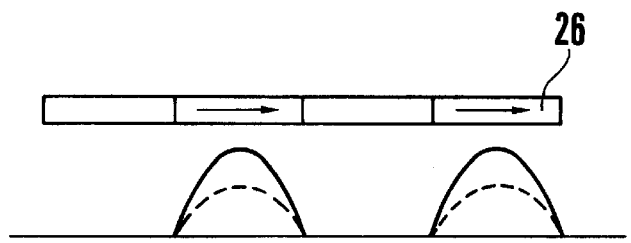

RECORDING MEDIUM ON WHICH INFORMATION IS RECORDED IN INTERMITTENT PATTERN, AND METHOD OF AND APPARATUS FOR REPRODUCING THE INFORMATION

BACKGROUND OF THE INVENTION

1. Field of the Invention

The present invention relates to a magnetic reproduction method of magnetically reading information from a magnetic recording medium, and a magnetism detecting device and a magnetism detecting apparatus for use in the magnetic reproduction method, as well as the magnetic recording medium.

2. Description of Related Art

Magnetically readable cards (hereinafter referred to as magnetic card(s)) have been used in a wide range of applications, for example, telephone cards, prepaid cards such as tickets, commutation tickets and admission tickets. This is because the magnetic cards, which are magnetically recorded, are resistant to dirt and have comparatively low running costs.

The magnetic cards are generally erasable and rewritable, but there are a large number of applications to be met with magnetic cards which are writable only once. If magnetic cards having lower running costs are developed, they can find far wider applications, such as admission cards for events or pass cards for door locks.

The present inventor has noted that toner having magnetism (hereinafter referred to as magnetic toner), for example, iron oxide, is used in copying machines or laser beam printers, and has obtained the idea of printing such magnetic toner on general-purpose plain paper or plastic film to form a magnetic recording medium. Conventionally, the magnetic toner has been used in laser beam printers, copying machines or the like as means for improving the resolution of recorded images, but no consideration has been given to a method of using the magnetic toner for the purpose of magnetic recording.

Although magnetic ink may be available in printing similarly to magnetic toner, magnetic ink easily spreads on paper other than selected kinds of paper, and involves the problem of drying. In addition, since magnetic ink is lower in sensitivity to magnetism than magnetic toner, magnetic ink is only suited to rough detection of magnetism, such as detection of the presence or absence of magnetism.

The present inventor used the aforesaid magnetic toner to print one stripe-shaped continuous recording track on plain paper, and carried out magnetic recording and reading on and from the recording track by means of a magnetic head. As a result, the following problems occurred.

Unlike magnetic powder for magnetic tape, the magnetic toner is not intended for magnetic recording and its coercive force Hc is as small as approximately 100 Oersteds. Accordingly, the magnetic toner is not resistant to self-demagnetization nor an external magnetic field, so that its magnetization is liable to vanish.

In addition to the aforesaid smallness of the coercive force Hc, the particles of the magnetic toner do not have a needle-like shape and are incapable of being oriented so that they can readily be magnetized in a particular direction. Accordingly, the amount of magnetic flux arising from the recorded magnetization is considerably small, so that a conventional inductive type of magnetic head is not able to perform reading with a high SIN ratio. For this reason, it has been extremely difficult to apply the magnetic toner to magnetic cards.

BRIEF SUMMARY OF THE INVENTION

One object of the present invention is to provide a magnetic recording medium which has a recording track formed by printing with magnetic toner or other means, and which is inexpensive, reliable and suitable for use in applications in which writing is performed only once.

Another object of the present invention is to provide a magnetic reproduction method, a magnetism detecting device and a magnetism detecting apparatus all of which are arranged to perform reading of information from the magnetic recording medium with a high S/N ratio.

To achieve the above objects, in accordance with one aspect of the present invention, there is provided a magnetic reproduction method of magnetically reading information from a magnetic recording medium, the magnetic reproduction method employing as the magnetic recording medium a magnetic recording medium provided with a recording track in which a magnetic material is disposed in an intermittent pattern corresponding to a digital signal, the magnetic reproduction method comprising the steps of magnetizing the magnetic material in the recording track of the magnetic recording medium immediately before reading information from the magnetic recording medium, and reading the information represented by the digital signal by detecting a magnetic flux arising from the magnetic material in the recording track, by using a magnetism detecting device after the aforesaid magnetizing step.

According to the above-described magnetic reproduction method, in the recording track of the magnetic recording medium, since the magnetic material is disposed in the intermittent pattern corresponding to the digital signal, it is possible to eliminate demagnetization due to the interference of magnetization between the portions of the magnetic material that correspond to adjacent recording bits, and it is possible to definitely distinguish the boundaries between recording bits. In addition, since the adjacent bits are distinguished on the basis of the presence or absence to the magnetic material, even if the magnetization of the magnetic material is affected by a disturbance due to an external magnetic field, it is possible to refresh the magnetization by magnetizing the magnetic material immediately before reading. Accordingly, even if the magnetic material of the recording track is a magnetic material having a small coercive force, such as magnetic toner, it is possible to ensure the reliability of recording and reproduction.

In addition, since the arrangement of the magnetic recording medium is such that the recording track is provided in the aforesaid intermittent pattern on a surface of, for example, plain paper or plastic film by printing with toner having magnetism, it is possible to inexpensively manufacture a magnetic recording medium suitable for use in applications in which writing is performed only once.

As the magnetism detecting device used in the above-described magnetic reproduction method, a device which makes use of a magnetic impedance effect is preferable because of its high sensitivity. In particular, it is preferable that the magnetism detecting element of the device be formed of a high-permeability magnetic film having a zigzag pattern.

Furthermore, as a specific magnetic reproduction method, there is provided a magnetic reproduction method wherein the magnetism detecting device is made to relatively move with respect to the magnetic recording medium in a longitudinal direction of the recording track of the magnetic recording medium so that information is read, the magnetism detecting device being a magnetism detecting device which makes use of a magnetic impedance effect and which is provided with two magnetism detecting elements respectively made of magnetic materials having equal characteristics, the two magnetism detecting elements being spaced apart from each other by a predetermined distance in a relative moving direction of the magnetism detecting device in such a manner that a longitudinal direction of each of the two magnetism detecting elements is parallel to a direction of a boundary between a magnetic material portion and a blank portion of the recording track, a high-frequency current being applied to each of the two magnetism detecting elements to convert, into electrical signals, impedance variations respectively occurring in the two magnetism detecting elements according to a magnetic flux arising from the magnetic material of the recording track, and then differential amplification of the electrical signals being performed to obtain a detection signal, thereby effecting reading with a high S/N ratio.

A magnetism detecting apparatus for use in the above-described magnetic reproduction method comprises two Colpitts oscillators which respectively include the two magnetism detecting elements respectively made of the magnetic materials having the equal characteristics, two envelope detecting circuits for envelope-detecting outputs of the two Colpitts oscillators, respectively, and a differential amplifier for amplifying a difference between outputs of the two envelope detecting circuits.

BRIEF DESCRIPTION OF THE SEVERAL VIEWS OF THE DRAWING

FIGS. 4(a), 4(b) and 4(c) are explanatory views aiding in describing the problem of a magnetism detecting device having only one magnetic film;

DETAILED DESCRIPTION OF THE INVENTION

Preferred embodiments of the present invention will be described below with reference to the accompanying drawings.

An embodiment of a magnetic card which is an embodiment of a magnetic recording medium according to the present invention will be described below with reference to FIGS. 1 and 2.

Figure 1:
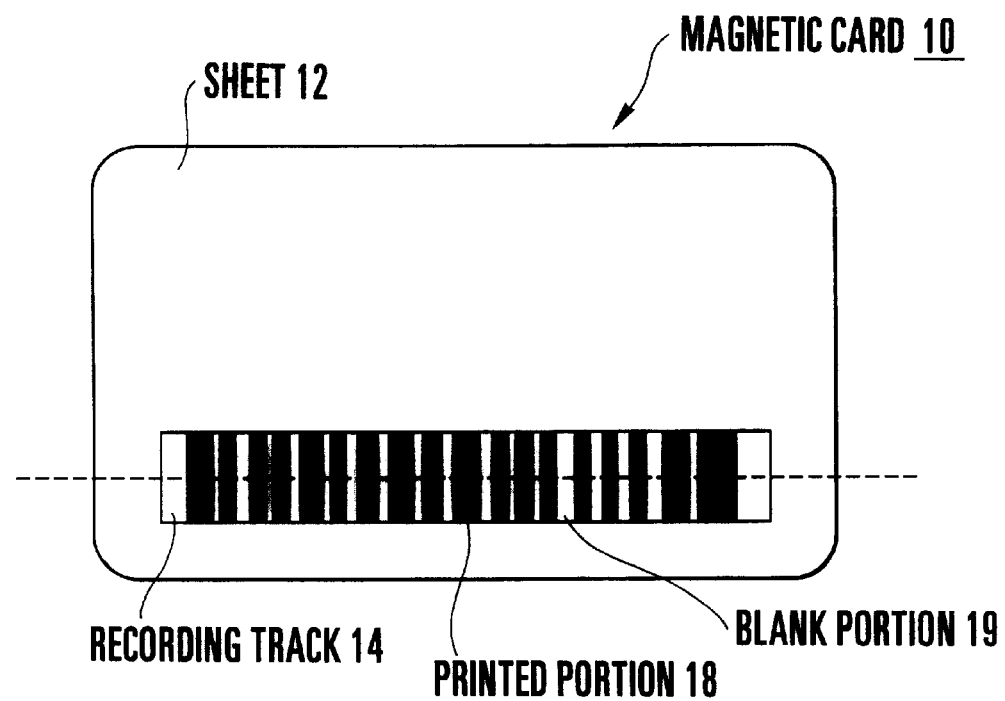
FIG. 1 is a diagrammatic plan view of a magnetic card which is an embodiment of a magnetic recording medium according to the present invention.

FIG. 1 diagrammatically shows an external appearance of the magnetic card on which a recording track is formed by printing with magnetic toner. General-purpose plain paper or plastic film may be used for a sheet 12 of a magnetic card 10. A recording track 14 is printed on a surface of the sheet 12 with the magnetic toner. The recording track 14 rectilinearly extends in the longitudinal direction of the magnetic card 10, and the magnetic toner is printed in the longitudinal direction in an intermittent pattern which corresponds to a digital signal.

Figure 2:
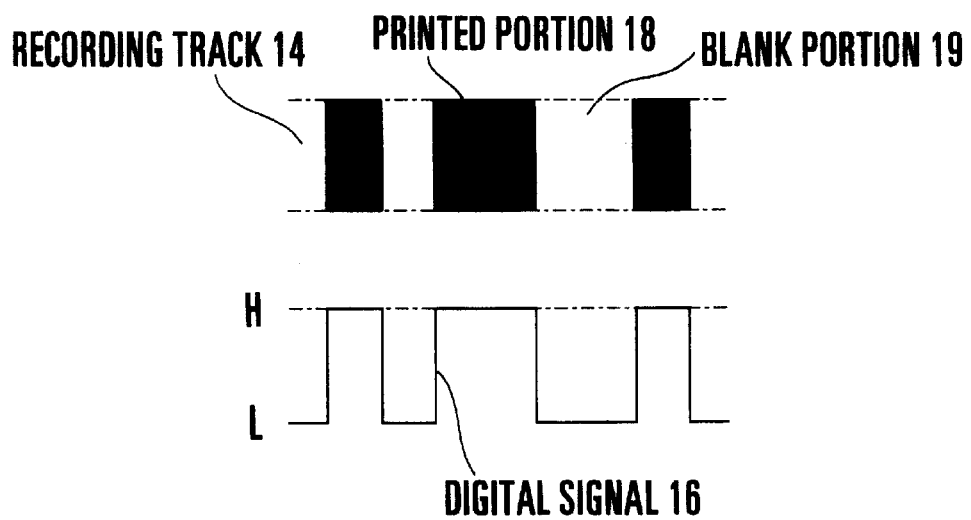
FIG. 2 is an explanatory view showing the correspondence between a recording track of the magnetic card and a digital signal.

Specifically, the recording track 14 is printed in such a manner that, as shown in FIG. 2, each printed portion 18 printed with the magnetic toner corresponds to a high-level part of a digital signal 16 conforming to a modulation method such as FM or NRZ, whereas each blank portion 19 having no print corresponds to a low-level part of the digital signal 16. Of course, this correspondence may be inverted. Incidentally, the magnetic toner of the printed portion 18 is uniformly magnetized so that recorded information represented by a plurality of bits of the digital signal 16 is magnetically read from the recording track 14, and it is herein assumed that the magnetization of the magnetic toner is performed immediately before reading.

Although the recording track 14 is printed by a method using a laser beam printer or the like, recent products have a resolution of 600 dpi or more which can ensure a sufficiently high print quality at print edges.

In the recording track 14 on which digital information represented by the plurality of bits of the digital signal 16 is recorded, the boundaries between adjacent bits can definitely be distinguished on the basis of the presence or absence of a print, and it is possible to avoid demagnetization due to the interference of magnetization between the adjacent bits, which demagnetization would have been experienced in the case of recording on magnetic tape. In addition, since the areas of the respective bits are distinguished on the basis of the presence or absence to the magnetic toner, even if the magnetization of the printed portions 18 printed with the magnetic toner having a small coercive force is erased by the disturbance of an external magnetism, such magnetization can readily be restored by uniformly magnetizing the magnetic toner immediately before reading. In other words, by magnetizing the magnetic toner immediately before reading, it is possible to refresh the required magnetization irrespective of the hysteresis of the magnetization due to the external magnetism after printing. This operation is useful in terms of security as well. For example, a counterfeit card to which a magnetic tape is attached can be excluded after its contents have been erased by magnetization immediately before reading.

Incidentally, in the recording track 14 printed with the magnetic toner, since the particles of the magnetic toner do not have a needle-like shape and are not oriented in a particular direction, it is not necessary to magnetize the magnetic toner in a particularly determined direction. Although an embodiment of a magnetic reproduction method which will be described later was employed to examine the difference between magnetic toner magnetized in the longitudinal direction of the recording track 14 and magnetic toner magnetized in a direction perpendicular to the recording track 14, no substantial difference was observed in output.

If the sheet 12 has white or other color and the printed portions 18 differ in color from the sheet 12, the print pattern of the recording track 14 becomes optically visible, so that the print pattern can easily be copied. If security is needed, at least the recording track 14 or the recording track 14 and a portion which surrounds the recording track 14 may be coated with a non-magnetic material having a color similar to the color of the magnetic toner, in the form of an overlying or underlying layer.

In this embodiment, the directions of the boundaries between the printed portions 18 and the blank portions 19 in the recording track 14 are parallel to the width direction of the recording track 14. However, as in the case of another embodiment which will be described later, the directions of the boundaries may be inclined by a predetermined azimuth angle with respect to the width direction of the recording track 14.

With the above-described arrangement, it is possible to provide a magnetic card as an inexpensive and highly reliable magnetic recording medium which is suited to an application in which writing needs only to be performed once.

An embodiment of a magnetism detecting device for use in magnetic-flux detection needed for reading information from the magnetic card 10 will be described below with reference to FIG. 3A. The magnetism detecting device adopts the principle of the device disclosed in Japanese Laid-Open Patent Application No. Hei 7-181239, the device making use of a magnetic impedance effect. The magnetic impedance effect is the phenomenon in which if a high-frequency current of MHz frequency band is applied to a magnetic element, the impedance of the magnetic element varies by some tens of percent owing to an external magnetic field. By utilizing this phenomenon, it is possible to realize a magnetism detecting device which is reduced in size but has a high sensitivity equal to that of a conventional fluxgate type.

Although, in the aforesaid magnetism detecting device disclosed in Japanese Laid-Open Patent Application No. Hei 7-181239, its magnetism detecting element is made from an amorphous wire, the magnetism detecting element of the present embodiment is made from a high-permeability magnetic film.

Figure 3A:
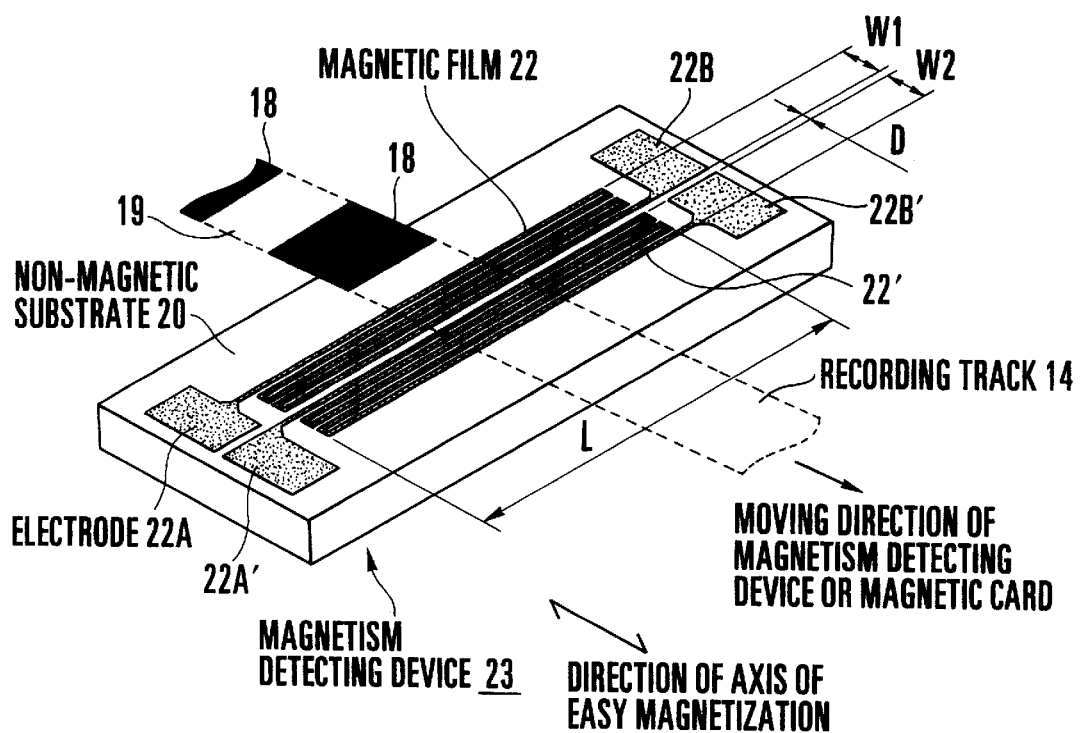
FIG. 3A is a diagrammatic perspective view showing an embodiment of a magnetism detecting device according to the present invention.

FIG. 3A shows the structure of the embodiment of the magnetism detecting device. In FIG. 3A, the recording track 14 of the magnetic card 10 of FIG. 1 is shown by dashed lines. During reading, a magnetism detecting device 23 relatively moves with respect to the recording track 14 in the state of being opposed to the recording track 14 in parallel therewith, i.e., the magnetism detecting device 23 or the magnetic card 10 moves. The moving direction of the magnetism detecting device 23 or the magnetic card 10 is parallel to the longitudinal direction of the recording track 14, as indicated by an arrow.

As shown in FIG. 3A, the magnetism detecting device 23 includes a non-magnetic substrate (hereinafter referred to as the substrate) 20 which is formed as a rectangular flat plate made of a non-magnetic material such as calcium titanate (Ti-Ca ceramics), glass oxide, titania ($TiO_2$) or alumina ($Al_2O_3$). The magnetism detecting device 23 is disposed in such a manner that the longitudinal direction of the substrate 20 is perpendicular to that of the recording track 14 and the top face of the substrate 20 is opposed to the recording track 14 in proximity to and in parallel with each other.

Two high-permeability magnetic films (hereinafter referred to as the magnetic films) 22 and 22' are formed on the top face of the substrate 20 as the magnetic detecting element of the magnetism detecting device 23. The high-permeability magnetic films 22 and 22' are made from a high-permeability metal magnetic film such as an Fe-Co-B amorphous film or a microcrystalline film such as an Fe-Ta-N film or an Fe-Ta-C film.

Each of the high-permeability magnetic films 22 and 22' is formed in a zigzag pattern in which a straight line is folded back in parallel by a plurality of times at predetermined intervals, and the magnetic flux arising from the recording track 14 is detected through each of the folded straight lines which extend in the longitudinal direction of each of the high-permeability magnetic films 22 and 22'. The high-permeability magnetic films 22 and 22' are spaced apart from each other by a distance D in the direction of relative movement of the magnetism detecting device 23 (in FIG. 3A, the longitudinal direction of the recording track 14), and the longitudinal direction of the zigzag pattern is parallel to the direction of each of the boundaries between the printed portions 18 and the blank portions 19 (in FIG. 3A, the width direction of the recording track 14).

Although it may be considered that the longitudinal direction of the zigzag pattern is made parallel to the direction of relative movement of the magnetism detecting device 23, it is impossible to ensure a sufficient length in the detection in which to detect the magnetic flux, because of the interference between adjacent bits of the recording track 14. If a length greater than 1 mm is not ensured, it is completely impossible to obtain substantial performance, by the influence of a diamagnetic field. For this reason, the arrangement in which the longitudinal direction of the zigzag pattern is parallel to the direction of each of the boundaries between the printed portions 18 and the blank portions 19 is greatly advantageous in that a sufficient length to reduce the diamagnetic field can be ensured.

The high-permeability magnetic films 22 and 22' are made equal to each other in shape, size and characteristic so that their detection outputs can be taken out through differential amplification, as will be described later.

Opposite ends 22A and 22B of the zigzag pattern of the magnetic film 22 and opposite ends 22A' and 22B' of the zigzag pattern of the magnetic film 22' are respectively formed in rectangular shapes as electrodes from which to obtain sensor outputs. If necessary, a conductive film such as Cu or Au may be formed on each of the ends 22A, 22B, 22A' and 22B'.

The magnetism detecting direction of the magnetism detecting device 23 is parallel to the longitudinal direction of the zigzag pattern, i.e., the direction of each of the boundaries between the printed portions 18 and the blank portions 19 in the recording track 14. To ensure the detection sensitivity of the magnetism detecting device 23, the high-permeability magnetic films 22 and 22' are imparted magnetic anisotropy so that the directions of their respective axes of easy magnetization are perpendicular to the longitudinal direction of the zigzag pattern in their respective film planes, as indicated by the double-headed arrow shown in FIG. 3A.

In addition, to increase the magnetism detection sensitivity, it is necessary to apply a bias magnetic field to the high-permeability magnetic films 22 and 22'.

Specifically, a direct-current bias magnetic field is equally applied to both of the magnetic films 22 and 22' in the longitudinal direction of the zigzag pattern within the respective film planes, by a permanent magnet, a coil or the like. The magnitude of the direct-current bias magnetic field is set to a range of, preferably 0.5–3 gausses in which the inclination of a variation in magnetic impedance increases, more preferably 1–2 gausses.

A length L of the zigzag pattern of each of the magnetic films 22 and 22' corresponds to a reading track length, and widths W1 and W2 which are perpendicular to the longitudinal directions of the respective zigzag patterns correspond to detection widths. The magnetic flux arising from each of the printed portions 18 of the recording track 14 is detected at a surface of L×W1 and a surface of L×W2. Accordingly, since the magnetic flux is detected at such surfaces unlike a conventional magnetic head which detects a magnetic flux via the line of a magnetic gap, the sensitivity of the device can be increased in structural terms as well. The distance D between the magnetic films 22 and 22' corresponds to the magnetic gap of a magnetic head.

Figure 3B:
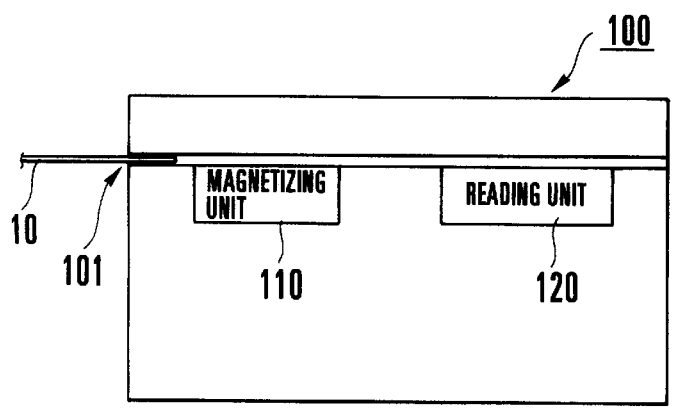
FIG. 3B is a schematic view showing a reading apparatus employing the magnetism detecting device.

An embodiment of a magnetic reproduction method of reading information from the magnetic card 10 by using the magnetism detecting device 23 will be described below with reference to FIG. 3B.

The magnetic card 10 is transported to a reading apparatus 100 by a transport unit (not shown), and immediately before information is read from the magnetic card 10, i.e., immediately before the magnetic card 10 reaches a reading unit 120 after having been inserted into an inserting slot 101 of the reading apparatus 100 provided with the magnetism detecting device 23, a direct-current magnetic field is applied to the recording track 14 of the magnetic card 10 by a magnetizing unit 110 so that the magnetic toner of the printed portions 18 is uniformly magnetized. After that, in the reading unit 120, the magnetism detecting device 23 or the magnetic card 10 is moved in the longitudinal direction of the recording track 14 and, at the same time, a high-frequency current is applied to the magnetic films 22 and 22'. Then, in the reading unit 120, an impedance variation which occurs in the magnetic films 22 and 22' by a magnetic impedance effect according to the magnetic flux arising from the recording track 14 is converted into an electrical signal, and this electrical signal is processed to reproduce a digital signal which corresponds to the intermittent pattern of the printed portions 18 of the recording track 14, and information represented by the digital signal is read. Incidentally, as one specific arrangement example for applying the high-frequency current to the magnetic films 22 and 22' and converting the impedance variation into the electrical signal, the respective magnetic films 22 and 22' may be incorporated into Colpitts oscillators, as in an embodiment of the magnetic detecting apparatus which will be described later.

Although either one of the magnetic films 22 and 22, may be provided in the magnetism detecting device 23, reading is possible, but a problem occurs for the following reason.

For example, if a magnetism detecting device in which only the magnetic film 22 is disposed on the substrate 20 as shown in FIG. 4(a) in cross section is used to read information from a continuously magnetized magnetic recording medium 24 and a discontinuously magnetized magnetic recording medium 26, the respective output waveforms shown in FIGS. 4(b) and 4(c) are obtained. In either case, the output waveform varies from the state shown by a solid line to the state shown by a dashed line owing to a device-to-medium spacing. However, in the case of the continuously magnetized magnetic recording medium 24, the output waveform exhibits a variation which is symmetrical with respect to a time axis, whereas, in the case of the discontinuously magnetized magnetic recording medium 26, the output waveform exhibits an asymmetrical variation which produces a secondary distortion, so that faithful reproduction of the recorded information becomes impossible.

Figure 5A:
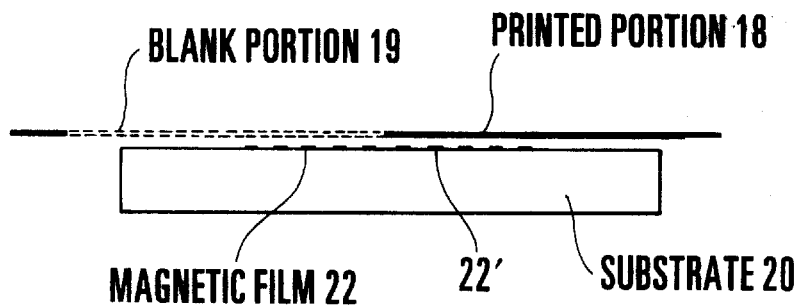
FIGS. 5(a), 5(b) and 5(c) are explanatory views aiding in describing the positional relation between the magnetism detecting device of FIG. 3A and a recording track as well as the relation between the positional relation and output waveforms.

In contrast, in the magnetism detecting device 23 in which the two magnetic films 22 and 22' are disposed in parallel, it is possible to solve the above problem by taking out a detection output through differential amplification, i.e., taking out the difference between the outputs of the magnetic films 22 and 22' as a detection signal. FIG. 5(a) is a cross-sectional view showing the positional relation between the recording pattern of the recording track 14 and the two magnetic films 22 and 22' of the magnetism detecting device 23. The magnetic films 22 and 22' are disposed in parallel so that the detection output can be taken out through differential amplification, as described above.

Figure 6:
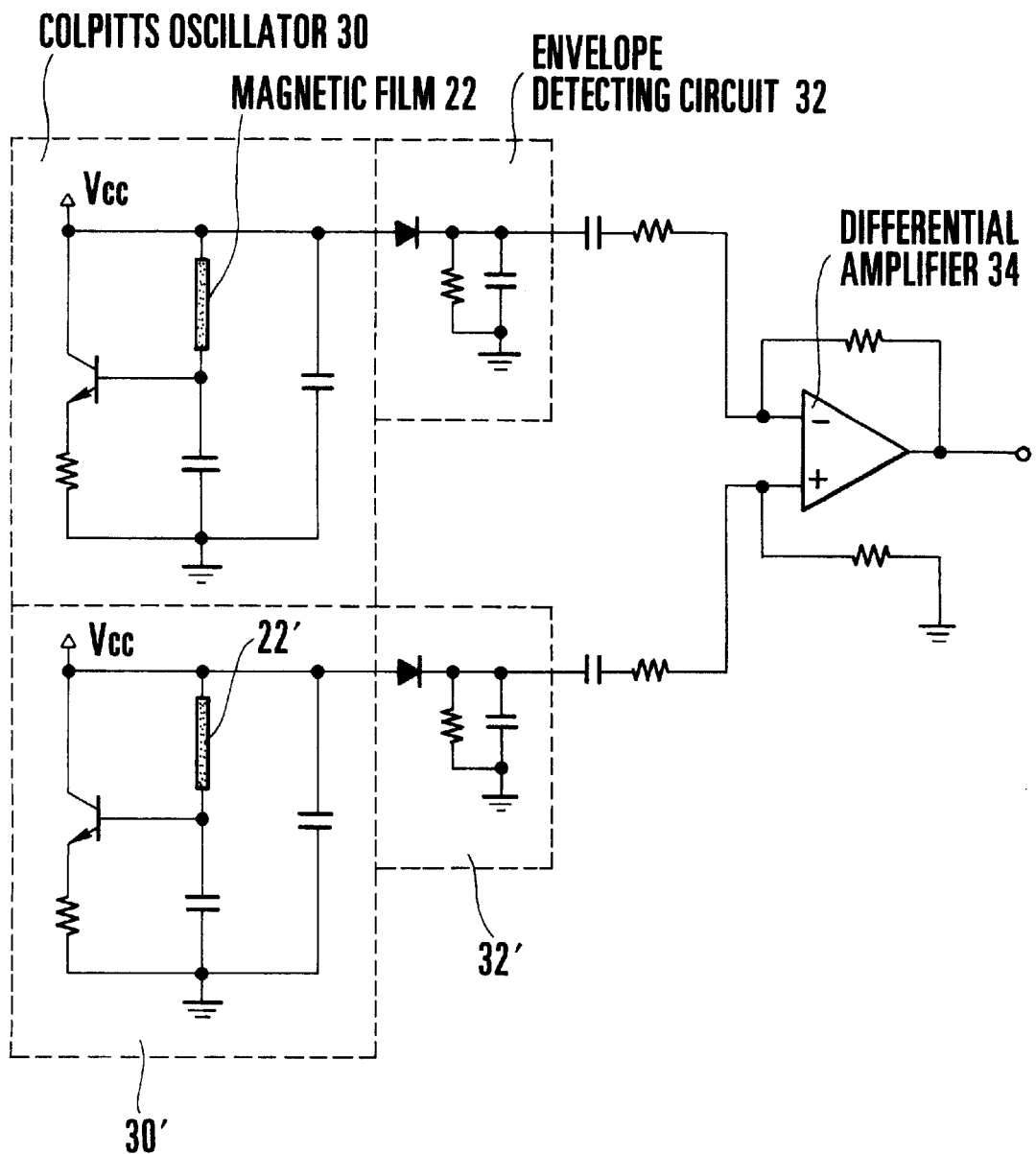
FIG. 6 is a circuit diagram showing the arrangement of an embodiment of an magnetism detecting apparatus according to the present invention.

An embodiment of a magnetism detecting apparatus for taking out the detection output through differential amplification is shown in FIG. 6.

In the arrangement of the magnetism detecting apparatus shown in FIG. 6, the two magnetic films 22 and 22' of the above-described magnetism detecting device 23 are respectively incorporated into two Colpitts oscillators 30 and 30'. The respective high-frequency currents oscillated in the Colpitts oscillators 30 and 30' are applied to the magnetic films 22 and 22', and the impedances of the magnetic films 22 and 22' vary according to the magnetic flux arising from the recording track 14 of the magnetic card 10, so that the amplitudes of the high-frequency currents oscillated by the respective Colpitts oscillators 30 and 30' vary. The outputs of the Colpitts oscillators 30 and 30' are respectively envelope-detected by two envelope detecting circuits 32 and 32'. The outputs of the envelope detecting circuits 32 and 32' are inputted to a differential amplifier 34, and the differential amplifier 34 amplifies the difference between the outputs of the respective envelope detecting circuits 32 and 32' and outputs the amplified difference as a detection signal. In this manner, the detection signal obtained via the magnetic films 22 and 22' can be taken out through differential amplification.

Referring back to FIG. 5(a), the state of the positional relation shown in FIG. 5(a) is the state in which the aforesaid detection output becomes a maximum. Specifically, a maximum detection output is provided when the recording track 14 and the magnetic films 22 and 22' are in the positional relation in which one of the printed portions 18 is located above the whole of either one of the magnetic films 22 and 22' and the adjacent blank portion 19 is located above the whole of the other. If such maximum detection output is provided, it can be determined that the portion of the distance D between the magnetic films 22 and 22' is located at the boundary between one of the printed portions 18 and the adjacent blank portion 19 of the recording track 14.

Figure 5B:
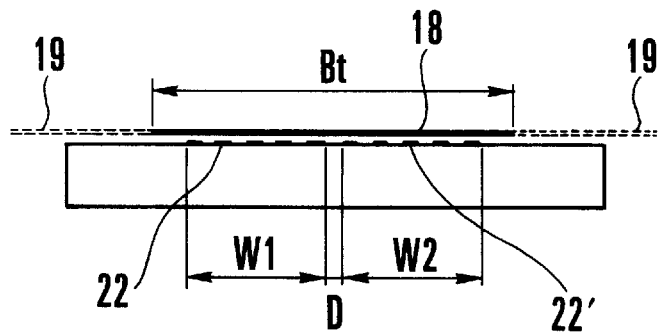

In the case of the positional relation shown in FIG. 5(b), the aforesaid detection output becomes a minimum. Specifically, a minimum detection output is provided when the recording track 14 and the magnetic films 22 and 22' are in the positional relation in which any one of the printed portions 18 and the blank portions 19 is located above the whole magnetic films 22 and 22'. If such minimum detection output is provided, it can be determined that the portion of the distance D between the magnetic films 22 and 22' is located at an approximately central position of any one of the printed portions 18 and the adjacent blank portions 19.

Incidentally, to eliminate the interference between adjacent ones of the printed portions 18 each of which corresponds to one bit of digital information, as shown in FIG. 5(b), the total dimension of the widths W1 and W2 of the zigzag patterns of the respective magnetic films 22 and 22' and the distance D therebetween needs to be not greater than a length Bt of any of the printed portions 18 and the blank portions 19 each of which corresponds to one bit in the recording track 14.

Figure 5C:
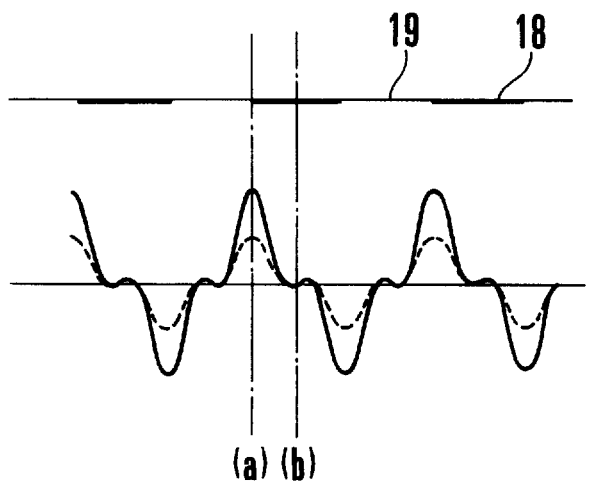

An example of a read waveform is shown in FIG. 5(c). In FIG. 5(c), the respective positions referred to in the above descriptions of FIGS. 5(a) and 5(b) are shown by dot-dashed lines. Even if the spacing between the magnetic films 22 and 22' and the recording track 14 becomes large, the detection output varies from the waveform shown by a solid line to the waveform shown by a dashed line in FIG. 5(c) and exhibits a variation symmetrical with respect to a time axis, whereas the position of detection of the boundary between the printed portion 18 and the blank portion 19 does not vary. In this manner, the print pattern of the recording track 14 is detected with a high S/N ratio by differential detection, and reading of the recording track 14 can be performed with a high SIN ratio.

Another embodiment of the magnetic card 10 will be described below with reference to FIG. 7.

As described above, in the magnetic reproduction method according to the present invention, it is necessary to make the width of the detecting part of the magnetism detecting device 23 not greater than the length Bt of the recording track 14 that corresponds to one bit, so that the linear density of the recording track 14 cannot be increased to several microns per unit bit length.

Figure 7:
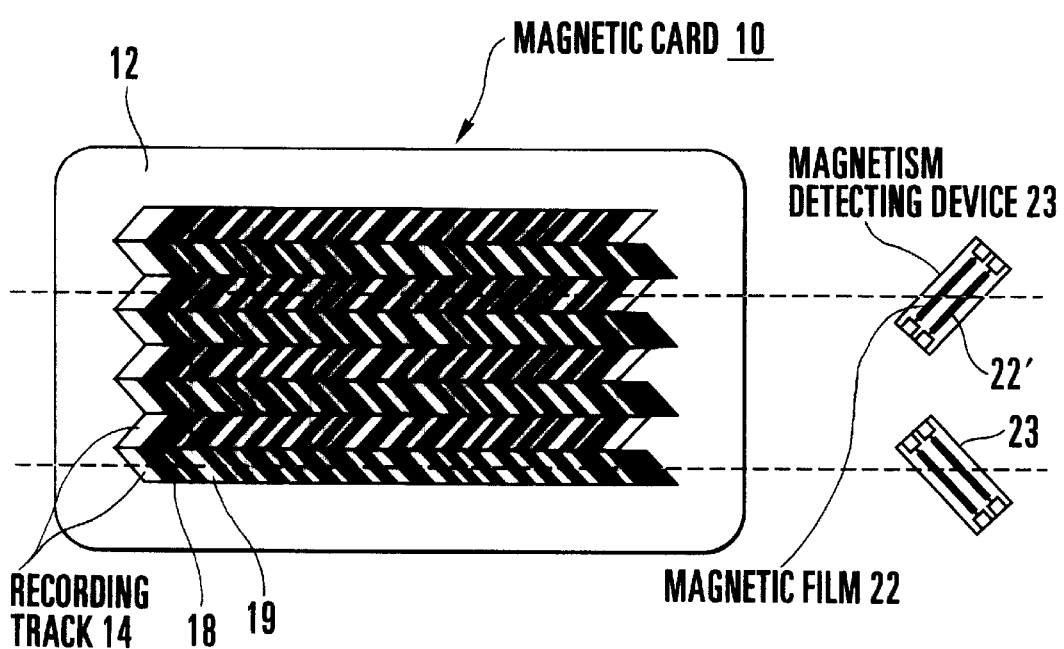
FIG. 7 is a diagrammatic plan view of a magnetic card which is another embodiment of the magnetic recording medium according to the present invention.

For this reason, if the capacity of the magnetic card 10 is to be increased, a plurality of recording tracks 14 are disposed in parallel in the width direction of the magnetic card 10, as shown in FIG. 7. In this case, in each of the recording tracks 14, the directions of the respective boundaries between the printed portions 18 and the blank portions 19 are inclined by a predetermined angle (a so-called azimuth) with respect to the width direction of the recording track 14. In addition, each of the recording tracks 14 and the adjacent one are inclined in azimuthally opposite directions, so that the directions of the respective boundaries between the printed portions 18 and the blank portions 19 alternate from track to track. Thus, crosstalk between adjacent ones of the recording tracks 14 can be reduced, so that it is possible to increase the recording capacity of the magnetic card 10 by disposing the plurality of recording tracks 14 in parallel without providing gaps (so-called guard bands) between the adjacent ones of the recording tracks 14.

Magnetic reproduction using a conventional magnetic tape has the problems that the boundaries between adjacent ones of a plurality of recording tracks become indistinct owing to a leakage magnetic field of a recording head and that recording takes time because overwriting is sequentially performed. In contrast, in the present embodiment, since the recording of the recording tracks 14 is effected by printing, the quality of the boundaries between the recording tracks 14 can be ensured and the magnetic card 10 can be manufactured in a short time.

As shown in FIG. 7, a plurality of magnetism detecting devices 23 are employed to read information from the magnetic card 10 according to the present embodiment. Each of the magnetism detecting devices 23 is disposed in such a manner that the longitudinal directions of the respective zigzag patterns of the magnetic films 22 and 22' are parallel to the directions of the respective boundaries between the printed portions 18 and the blank portions 19 of the corresponding one of the recording tracks 14.

Although, in each of the embodiments of the magnetic cards 10 shown in FIGS. 1 and 7, the recording track 14 is formed by printing an intermittent pattern of magnetic toner, the recording track 14 may also be formed by disposing a magnetic material other than magnetic toner, for example a metal magnetic material, in an intermittent pattern corresponding to a digital signal.

Although, in the embodiment of the magnetism detecting device 23 shown in FIG. 3, each of the magnetic films 22 and 22' which constitute the magnetism detecting element is formed in the zigzag pattern, the type of pattern is not limited to such zigzag pattern. The magnetism detecting element may be made from an amorphous wire. In addition, although the magnetism detecting device 23 is arranged to detect a magnetic flux by the magnetic impedance effect, other types of magnetism detecting devices, such as a MR device which detects a magnetic flux by a magneto-resistive effect, may be employed according to the strength of magnetization of a magnetic material for the recording track which strength depends on the arrangement of the magnetic card.

The aforesaid embodiments will be described in further detail.

Regarding the embodiment of the magnetic card, in the arrangement shown in FIG. 1, the sheet 12 made of plain paper was used, and the size of the recording track 14 was set to 3 inches long and 1.5 mm wide. One bit in the recording track 14 was set to 0.3 mm long. An intermittent pattern was printed in which the printed portions 18 and the blank portions 19 were alternately repeated at regular intervals. The intermittent pattern was printed with magnetic toner by means of a laser beam printer manufactured by Canon Inc. The printed portions 18 were magnetized by a permanent magnet immediately before reading so that the longitudinal direction of the recording track 14 corresponded to the N-S direction.

Regarding the embodiment of the magnetism detecting device, in the arrangement shown in FIG. 3A, an Fe-Ta-C magnetic film with a film thickness of 2 $\mu$m was formed as each of the magnetic films 22 and 22'. The pattern size of each of the magnetic films 22 and 22' was as follows: the width of each folded straight line=16 $\mu$m; the length L of the zigzag pattern=3 mm; the width W1=W2 =120 $\mu$m; the distance D=20 $\mu$m; and the number of folds=four.

Regarding the embodiment of the magnetism detecting apparatus, in the arrangement shown in FIG. 6, its gain was set to 100 times. The application of a direct-current bias magnetic field for ensuring the sensitivity of the magnetism detecting device was performed with a plurality of values of 0.5–2.5 gausses. The scanning speed of the magnetic card 10 was 40 mm/s.

Figure 8:
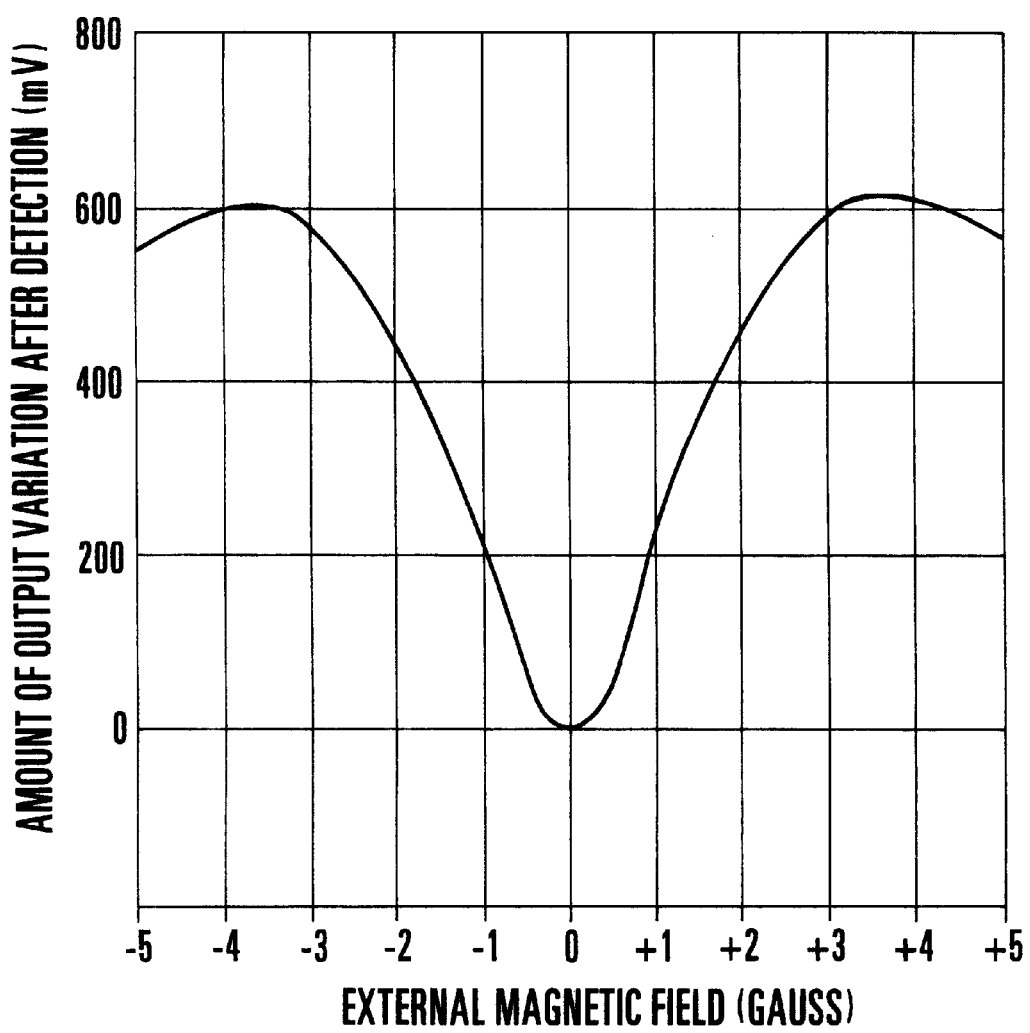
FIG. 8 is a graph showing the relation between an external magnetic field and the amount of output variation after detection in an embodiment of the present invention.
Figure 9:
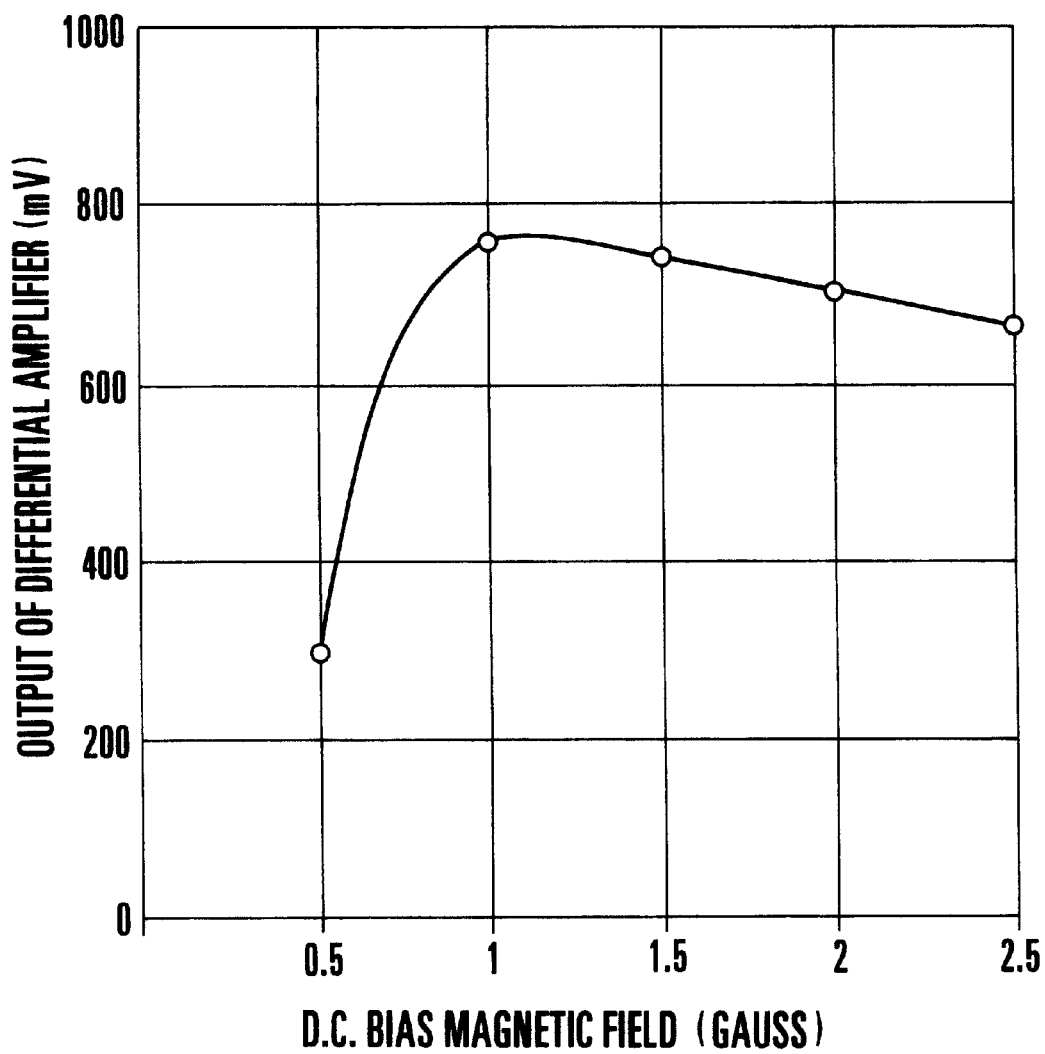
FIG. 9 is a graph showing the relation between a direct-current bias magnetic field and a differential amplifier output in the embodiment of FIG. 8.

The results are shown in FIGS. 8 and 9.

FIG. 8 is a graph showing the data obtained by examining the relation between an external magnetic field and the amount of output variation after envelope detection by the envelope detecting circuits 32 and 32' in the arrangement shown in FIG. 6. The source voltage was 2.5 V, and the oscillation amplitude was 2 Vpp at 30 MHz with no magnetic field applied. As shown in FIG. 8, an approximately symmetrical characteristic is obtained, and when the external magnetic field exceeds 0.5 gauss, the amount of variation sharply increases, and reaches a peak at 3.5 gausses.

FIG. 9 is a graph showing the output characteristic of the differential amplifier 34 which was obtained when the magnetic card 10, the printed portions 18 of the recording track 14 of which were magnetized immediately before reading as described previously, was made to run along the magnetism detecting device 23 while a direct-current bias magnetic field was being applied to the magnetic films 22 and 22'. When the direct-current bias magnetic field is 0.5 gauss, the inclination of the magnetic impedance characteristic is small so that the output of the differential amplifier 34 is low. At approximately 1 gauss at which such inclination becomes large, a maximum of 760 mv is obtained. When the direct-current bias magnetic field exceeds approximately 1 gauss, the output of the differential amplifier 34 becomes moderately lower with a gradual reduction in the inclination. Although not shown, when the direct-current bias magnetic field exceeds 3 gausses, the output of the differential amplifier 34 abruptly lowers. Accordingly, the practical range of the direct-current bias magnetic field is 0.5–3 gausses, preferably 1–2 gausses.

As is apparent from the foregoing description, in accordance with the present embodiments, a magnetic reproduction method of magnetically reading information from a magnetic recording medium employs as the magnetic recording medium a magnetic recording medium provided with a recording track in which a magnetic material is disposed in an intermittent pattern corresponding to a digital signal, specifically, a magnetic recording medium in which the recording track is provided on a surface of, for example, plain paper or plastic film by printing with toner having magnetism. The magnetic reproduction method comprises the steps of magnetizing the magnetic material in the recording track of the magnetic recording medium immediately before reading information from the magnetic recording medium, and reading the information represented by the digital signal by detecting a magnetic flux arising from the magnetic material in the recording track, by using a magnetism detecting device after the aforesaid magnetizing step. Accordingly, the magnetic recording medium is suited to applications in which writing is performed only once, and can be manufactured at a low cost in a short time by using a laser beam printer or the like. Even if the magnetic material of the recording track is a magnetic material having a small coercive force, such as toner having magnetism, information is not erased by a disturbance due to an external magnetic field or during long-term storage, and reading can be effected with a high S/N ratio and the reliability of recording and reproduction can be ensured. In addition, the magnetic recording medium is advantageous in terms of security, since counterfeited magnetic recording media using magnetic tape or the like can be eliminated and the pattern of the recording track can be made invisible. In addition, if a plurality of recording tracks are disposed in parallel, the capacity of the magnetic recording medium can readily be increased.

As a magnetism detecting device for use in the aforesaid magnetic reproduction method, it is possible to provide a superior magnetism detecting device which makes use of a magnetic impedance effect and which is arranged in such a manner that two magnetism detecting elements respectively made of magnetic materials having equal characteristics are disposed in parallel so that magnetism can be detected with high sensitivity through differential amplification with a high S/N ratio. Furthermore, it is possible to provide a superior magnetism detecting apparatus which comprises two Colpitts oscillators which respectively includes the two magnetism detecting elements of the magnetism detecting device, two envelope detecting circuits, and a differential amplifier so that magnetism can be detected with high sensitivity and with a high S/N ratio. In addition, if the magnetism detecting device or the magnetism detecting apparatus is employed in constructing a reading apparatus, the magnetism detecting device or the magnetism detecting apparatus can be incorporated into a general card reader, or a hand-scan reading apparatus can also be constructed because the magnetism detecting device has no speed dependence. Since conventional components can be used except for the magnetism detecting device or the magnetism detecting apparatus, it is possible to inexpensively supply the whole system of the reading apparatus.

What is claimed is:

1. A magnetic recording and reproduction method comprising the steps of:

providing in the recording method a magnetic recording medium with a recorded track in which a magnetic material is disposed in an intermittent pattern corresponding to a digital signal; and in the magnetic reproduction method magnetizing the magnetic material in the recording track of the magnetic recording medium immediately before reading information from the magnetic recording medium; and reading the information represented by the digital signal by detecting a magnetic flux arising from the magnetic material in the recording track, by using a magnetism detecting device after said magnetizing step;

wherein, in said step of reading the information, the magnetism detecting device is made to relatively move with respect to the magnetic recording medium in a longitudinal direction of the recording track of the magnetic recording medium;

the magnetism detecting device being a magnetism detecting device, which makes use of a magnetic impedance effect, which is used in said magnetic reproduction method and which is provided with two magnetism detecting elements respectively made of magnetic materials having equal characteristics, the two magnetism detecting elements being spaced apart from each other by a predetermined distance in a relative moving direction of the magnetism detecting device in such a manner that a longitudinal direction of each of the two magnetism detecting elements is parallel to a direction of a boundary between a magnetic material portion and a blank portion of the recording track, said two magnetism detecting elements are respectively formed as two high-permeability magnetic films which are respectively formed on a non-magnetic substrate in zigzag patterns in each of which a straight line is folded back in parallel by a plurality of times at predetermined intervals, said two high-permeability magnetic films being spaced apart from each other by a predetermined distance in the relative moving direction of said magnetism detecting device in such a manner that a longitudinal direction of each of said zigzag patterns is parallel to the direction of the boundary between the magnetic material portion and the blank portion of said recording track, said two high-permeability magnetic films being imparted magnetic anisotropy so that a direction of an axis of easy magnetization of each of said two high-permeability magnetic films is perpendicular to the longitudinal direction of each of said zigzag patterns in a film plane of each of said two high-permeability magnetic films;

a high-frequency current being applied to each of the two magnetism detecting elements to convert, into electrical signals, impedance variations respectively occurring in the two magnetism detecting elements according to a magnetic flux arising from the magnetic material of the recording track, and then differential amplification of the electrical signals being performed to obtain a detection signal.

2. A magnetic recording and reproduction method comprising the steps of:

providing in the recording method a magnetic recording medium with a recorded track in which a magnetic material is disposed in an intermittent pattern corresponding to a digital signal; and in the magnetic reproduction method magnetizing the magnetic material in the recording track of the magnetic recording medium immediately before reading information from the magnetic recording medium; and reading the information represented by the digital signal by detecting a magnetic flux arising from the magnetic material in the recording track, by using a magnetism detecting device after said magnetizing step;

wherein, in said step of reading the information, the magnetism detecting device is made to relatively move with respect to the magnetic recording medium in a longitudinal direction of the recording track of the magnetic recording medium;

the magnetism detecting device being a magnetism detecting device, which makes use of a magnetic impedance effect, which is used in said magnetic reproduction method and which is provided with two magnetism detecting elements respectively made of magnetic materials having equal characteristics, the two magnetism detecting elements being spaced apart from each other by a predetermined distance in a relative moving direction of the magnetism detecting device in such a manner that a longitudinal direction of each of the two magnetism detecting elements is parallel to a direction of a boundary between a magnetic material portion and a blank portion of the recording track, said two magnetism detecting elements are respectively formed as two high-permeability magnetic films which are respectively formed on a non-magnetic substrate in zigzag patterns in each of which a straight line is folded back in parallel by a plurality of times at predetermined intervals, said two high-permeability magnetic films being spaced apart from each other by a predetermined distance in the relative moving direction of said magnetism detecting device in such a manner that a longitudinal direction of each of said zigzag patterns is parallel to the direction of the boundary between the magnetic material portion and the blank portion of said recording track, said two high-permeability magnetic films being imparted magnetic anisotropy so that a direction of an axis of easy magnetization of each of said two high-permeability magnetic films is perpendicular to the longitudinal direction of each of said zigzag patterns in a film plane of each of said two high-permeability magnetic films;

a total dimension, which is obtained by adding a distance between said zigzag patterns to a sum of dimensions of said two high-permeability magnetic films, each of which dimensions is measured in a width direction perpendicular to the longitudinal direction of a corresponding one of said zigzag patterns, is not greater than a length corresponding to one bit in said recording track of said magnetic recording medium;

a high-frequency current being applied to each of the two magnetism detecting elements to convert, into electrical signals, impedance variations respectively occurring in the two magnetism detecting elements according to a magnetic flux arising from the magnetic material of the recording track, and then differential amplification of the electrical signals being performed to obtain a detection signal.

3. A magnetic recording and reproduction method comprising the steps of:

providing in the recording method a magnetic recording medium with a recorded track in which a magnetic material is disposed in an intermittent pattern corresponding to a digital signal; and in the magnetic reproduction method magnetizing the magnetic material in the recording track of the magnetic recording medium immediately before reading information from the magnetic recording medium; and reading the information represented by the digital signal by detecting a magnetic flux arising from the magnetic material in the recording track, by using a magnetism detecting device after said magnetizing step;

wherein, in said step of reading the information, the magnetism detecting device is made to relatively move with respect to the magnetic recording medium in a longitudinal direction of the recording track of the magnetic recording medium;

the magnetism detecting device being a magnetism detecting device, which makes use of a magnetic impedance effect, which is used in said magnetic reproduction method and which is provided with two magnetism detecting elements respectively made of magnetic materials having equal characteristics, the two magnetism detecting elements being spaced apart from each other by a predetermined distance in a relative moving direction of the magnetism detecting device in such a manner that a longitudinal direction of each of the two magnetism detecting elements is parallel to a direction of a boundary between a magnetic material portion and a blank portion of the recording track;

a magnetic detecting apparatus comprising two Colpitts oscillators which respectively include said two magnetism detecting elements respectively made of the magnetic materials having the equal characteristics-in said magnetism detecting device;

two envelope detecting circuits for envelope-detecting outputs of said two Colpitts oscillators, respectively;

a differential amplifier for amplifying a difference between outputs of said two envelope detecting circuits;

a high-frequency current being applied to each of the two magnetism detecting elements to convert, into electrical signals, impedance variations respectively occurring in the two magnetism detecting elements according to a magnetic flux arising from the magnetic material of the recording track, and then differential amplification of the electrical signals being performed to obtain a detection signal.

4. A magnetic reproduction method of magnetically reading information from a magnetic recording medium, wherein said magnetic reproduction method employs as the magnetic recording medium a magnetic recording medium with a recording track in which a magnetic material is disposed in an intermittent pattern corresponding to a digital signal, said magnetic reproduction, method comprising the steps of;

magnetizing the magnetic material in the recording track of the magnetic recording medium immediately before reading information from the magnetic recording medium; and reading the information represented by the digital signal by detecting a magnetic flux arising from the magnetic material in the recording track, by using a magnetism detecting device after said magnetizing step, the magnetism detecting device being made to relatively move with respect to the magnetic recording medium in a longitudinal direction of the recording medium, the magnetism detecting device being a magnetism detecting device which makes use of a magnetic impedance effect and which is provided with two magnetism detecting elements respectively made of magnetic materials having equal characteristics, the two magnetism detecting elements being spaced apart from each other by a predetermined distance in the relative moving direction of the magnetic detecting device in such a manner that a longitudinal direction of each of the two magnetism detecting elements is parallel to a direction of a boundary between a magnetic material portion and a blank portion of the recording track, said two magnetism detecting elements are respectively formed as two high-permeability magnetic films which are respectively formed on a non-magnetic substrate in zigzag patterns in each of which a straight line is folded back in parallel by a plurality of times at predetermined intervals, said two high-permeability magnetic films being spaced apart from each other by a predetermined distance in the relative moving direction of said magnetism detecting device in such a manner that a longitudinal direction of each of said zigzag patterns is parallel to the direction of the boundary between the magnetic material portion and the blank portion of said recording track, said two high-permeability magnetic films being imparted magnetic anisotropy so that a direction of an axis of easy magnetization of each of said two high-permeability magnetic films is perpendicular to the longitudinal direction of each of said zigzag patterns in a film plane of each of said two high-permeability magnetic films, a high-frequency current being applied to each of the two magnetism detecting elements to convert, into electrical signals, impedance variations respectively occurring in the two magnetism detecting elements according to a magnetic flux arising from the magnetic material of the recording track, and then differentially amplifying the electrical signals to obtain a detection signal.

5. A magnetism detecting apparatus comprising:

two Colpitts oscillators which respectively include said two magnetism detecting elements respectively made of the magnetic materials having the equal characteristics in said magnetism detecting device according to claim 4;

two envelope detecting circuits for envelope-detecting outputs of said two Colpitts oscillators, respectively; and a differential amplifier for amplifying a difference between outputs of said two envelope detecting circuits.

\* \* \* \* \*

UNITED STATES PATENT AND TRADEMARK OFFICE
CERTIFICATE OF CORRECTION

PATENT NO. : 6,073,845
DATED : June 13, 2000
INVENTOR(S) : Masahiro Kawase

It is certified that error appears in the above-identified patent and that said Letters Patent is hereby corrected as shown below:

Column 1,
Line 67, delete "SIN ratio" and insert -- S/N ratio --.

Column 9,
Line 22, delete "SIN ratio" and insert -- S/N ratio --.

Column 11,
Line 10, delete "760mv" and insert -- 760 mV --.

Column 16,
Line 22, after "5." delete "A" and insert -- A magnetic reproduction method of magnetically reading information from a magnetic recording medium, wherein said magnetic reproduction method employs as the magnetic recording medium a magnetic recording medium with a recording track in which a magnetic material is disposed in an intermittent pattern corresponding to a digital signal,
   said magnetic reproduction method comprising the steps of:
   magnetizing the magnetic material in the recording track of the magnetic recording medium immediately before reading information from the magnetic recording medium; and
   reading the information represented by the digital signal by detecting a magnetic flux arising from the magnetic material in the recording track, by using a magnetism detecting device after said magnetizing step,
   the magnetism detecting device being made to relatively move with respect to the magnetic recording medium in a longitudinal direction of the recording medium,
   the magnetism detecting device being a magnetism detecting device which makes use of a magnetic impedance effect and which is provided with two magnetism detecting elements respectively made of magnetic materials having equal characteristics, the two magnetism detecting elements being spaced apart from each other by a predetermined distance in the relative moving direction of the magnetic detecting device in such a manner that a longitudinal direction of each of the two magnetism detecting elements is parallel to a direction of a boundary between a magnetic material portion and a blank portion of the recording track,
   a --.

Column 16,
Lines 26-27, delete "accordingto claim 4".
Lines 29-30, delete "; and".

UNITED STATES PATENT AND TRADEMARK OFFICE
CERTIFICATE OF CORRECTION

PATENT NO. : 6,073,845
DATED : June 13, 2000
INVENTOR(S) : Masahiro Kawase

It is certified that error appears in the above-identified patent and that said Letters Patent is hereby corrected as shown below:

Column 16,
Line 33, delete "." and insert -- a high-frequency current being applied to each of the two magnetism detecting elements to convert, into electrical signals, impedance variations respectively occurring in the two magnetism detecting elements according to a magnetic flux arising from the magnetic material of the recording track, and then differentially amplifying the electrical signals to obtain a detection signal. --.

Signed and Sealed this

Twenty-fifth Day of December, 2001

*Attest:*

*Attesting Officer*

JAMES E. ROGAN
*Director of the United States Patent and Trademark Office*